United States Patent
Dadheech et al.

(10) Patent No.: US 11,179,711 B2
(45) Date of Patent: Nov. 23, 2021

(54) SELF-CLEANING FILM SYSTEM AND METHOD OF FORMING SAME

(71) Applicant: GM GLOBAL TECHNOLOGY OPERATIONS LLC, Detroit, MI (US)

(72) Inventors: Gayatri V. Dadheech, Bloomfield Hills, MI (US); Thomas A. Seder, Fraser, MI (US); James A. Carpenter, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 130 days.

(21) Appl. No.: 16/742,491

(22) Filed: Jan. 14, 2020

(65) Prior Publication Data

US 2020/0147598 A1 May 14, 2020

Related U.S. Application Data (60) Division of application No. 15/945,259, filed on Apr. 4, 2018, now Pat. No. 10,569,263, which is a
(Continued)

(51) Int. Cl.
*B01J 35/00* (2006.01)
*B01J 21/06* (2006.01)
(Continued)

(52) U.S. Cl.
CPC ........... *B01J 35/004* (2013.01); *B01J 21/063* (2013.01); *C09D 5/00* (2013.01); *C09D 5/1681* (2013.01);
(Continued)

(58) Field of Classification Search
CPC .............................. B01J 35/004; B01J 21/063
See application file for complete search history.

(56) References Cited

U.S. PATENT DOCUMENTS

| 4,047,804 A | 9/1977 | Stephens |
|---|---|---|
| 4,449,050 A | 5/1984 | Kamhi |

(Continued)

FOREIGN PATENT DOCUMENTS

| CN | 101422974 A | 5/2009 |
|---|---|---|
| CN | 101868762 A | 10/2010 |

(Continued)

OTHER PUBLICATIONS

First Office Action for Chinese Patent Application No. 201810465452.5 dated Feb. 3, 2020 with English language machine translation, 21 pages.
(Continued)

*Primary Examiner* — Michael P Wieczorek
(74) *Attorney, Agent, or Firm* — Harness, Dickey & Pierce, P.L.C.

(57) ABSTRACT

A method of forming a film system includes depositing a monolayer formed from a fluorocarbon onto a substrate. After depositing, the method includes ablating the monolayer to define a plurality of cavities therein, wherein each of the plurality of cavities is spaced apart from an adjacent one of the plurality of cavities along the monolayer. After ablating, the method includes embedding a photocatalytic material into each of the plurality of cavities to form a film on the substrate and thereby form the film system. The film system includes a plurality of regions including the photocatalytic material and disposed within the monolayer such that each of the plurality of regions abuts and is surrounded by the fluorocarbon.

20 Claims, 3 Drawing Sheets

Related U.S. Application Data continuation of application No. 15/598,845, filed on May 18, 2017, now Pat. No. 10,556,231.

(51) Int. Cl.
| | | |
|---|---|---|
| *G02B 1/18* | (2015.01) | |
| *G02B 27/00* | (2006.01) | |
| *C09D 5/00* | (2006.01) | |
| *C09D 5/16* | (2006.01) | |
| *G02B 1/11* | (2015.01) | |
| *B08B 17/02* | (2006.01) | |

(52) U.S. Cl.
CPC .......... *G02B 1/18* (2015.01); *G02B 27/0006* (2013.01); *B08B 17/02* (2013.01); *G02B 1/11* (2013.01)

(56) References Cited

U.S. PATENT DOCUMENTS

| | | |
|---|---|---|
| 4,536,179 A | 8/1985 | Anderson et al. |
| 4,915,981 A | 4/1990 | Traskos et al. |
| 6,055,085 A | 4/2000 | Nakashima et al. |
| 6,101,266 A | 8/2000 | Laskowski et al. |
| 6,406,158 B1 | 6/2002 | Ohkawa |
| 6,797,974 B2 | 9/2004 | Philipp et al. |
| 7,359,543 B2 | 4/2008 | Tsuji et al. |
| 8,047,426 B2 | 11/2011 | Haycock et al. |
| 9,044,574 B2 | 6/2015 | Yoshimachi |
| 9,259,513 B2 * | 2/2016 | Bedwell ............... A61L 29/106 |
| 9,468,088 B2 | 10/2016 | Nah |
| 9,611,016 B2 | 4/2017 | Salters et al. |
| 9,861,974 B2 | 1/2018 | Dadheech et al. |
| 10,052,622 B2 | 8/2018 | Dadheech et al. |
| 10,195,602 B2 | 2/2019 | Dadheech et al. |
| 10,274,647 B2 | 4/2019 | Seder et al. |
| 10,429,641 B2 | 10/2019 | Carpenter et al. |
| 10,533,249 B2 | 1/2020 | Dadheech et al. |
| 10,583,428 B2 | 3/2020 | Seder et al. |
| 2005/0186871 A1 | 8/2005 | Hockaday |
| 2006/0150862 A1 | 7/2006 | Zhao et al. |
| 2007/0237943 A1 | 10/2007 | Wakizaka et al. |
| 2008/0053308 A1 | 3/2008 | Marzolin et al. |
| 2009/0045617 A1 | 2/2009 | Lawandy et al. |
| 2009/0130608 A1 | 5/2009 | Irving et al. |
| 2009/0196791 A1 | 8/2009 | Ogata |
| 2009/0267015 A1 | 10/2009 | Ogata |
| 2010/0028604 A1 | 2/2010 | Bhushan et al. |
| 2010/0128965 A1 | 5/2010 | Blair |
| 2011/0200656 A1 | 8/2011 | Olsson |
| 2011/0220855 A1 | 9/2011 | Weir et al. |
| 2013/0087374 A1 | 4/2013 | Nah |
| 2014/0083473 A1 | 3/2014 | Lawandy |
| 2014/0147654 A1 | 5/2014 | Walther et al. |
| 2015/0238644 A1 | 8/2015 | Sung et al. |
| 2016/0107204 A1 | 4/2016 | Lawandy |
| 2017/0056871 A1 | 3/2017 | Dadheech et al. |
| 2018/0154345 A1 | 6/2018 | Dadheech et al. |
| 2018/0318820 A1 | 11/2018 | Dadheech et al. |
| 2018/0320023 A1 | 11/2018 | Dadheech et al. |
| 2018/0333709 A1 | 11/2018 | Seder et al. |
| 2018/0333710 A1 | 11/2018 | Dadheech et al. |
| 2018/0333756 A1 | 11/2018 | Seder et al. |
| 2018/0334742 A1 | 11/2018 | Dadheech et al. |
| 2018/0335548 A1 | 11/2018 | Seder et al. |
| 2018/0348509 A1 | 12/2018 | Carpenter et al. |
| 2019/0369389 A1 | 12/2019 | Carpenter et al. |

FOREIGN PATENT DOCUMENTS

| | | |
|---|---|---|
| CN | 102998723 A | 3/2013 |
| CN | 103241961 A | 8/2013 |
| CN | 105038438 A | 11/2015 |
| CN | 106477901 A | 3/2017 |
| CN | 106633158 A | 5/2017 |
| CN | 107083184 A | 8/2017 |
| CN | 108948889 A | 12/2018 |
| CN | 108949031 A | 12/2018 |
| CN | 108949050 A | 12/2018 |
| CN | 108953597 A | 12/2018 |
| CN | 108953598 A | 12/2018 |
| CN | 108976873 A | 12/2018 |
| DE | 102018111826 A1 | 11/2018 |
| DE | 102018111827 A1 | 11/2018 |
| DE | 102018111828 A1 | 11/2018 |
| DE | 102018111830 A1 | 11/2018 |
| DE | 102018111831 A1 | 11/2018 |
| DE | 102018112987 A1 | 12/2018 |
| JP | S63308920 A | 12/1988 |
| KR | 20160012190 A | 2/2016 |
| WO | 2005077556 A1 | 8/2005 |
| WO | 2011123373 A1 | 10/2011 |
| WO | 2015194200 A1 | 12/2015 |

OTHER PUBLICATIONS

First Office Action for Chinese Patent Application No. 201810440411.0 dated Mar. 4, 2020 with English language machine translation, 21 pages.

First Office Action for Chinese Patent Application No. 201810435135.9 dated Mar. 12, 2020 with English language machine translation, 18 pages.

Xin, Zhong et al., "Research progress of fabrication and application of superamphiphobic surface," Chemical Industry and Engineering Progress, 2, pp. 447-455, 478 (2015) (Abstract Only).

Seder, Thomas A. et al., U.S. Appl. No. 16/809,056, filed Mar. 4, 2020 entitled, "Textured Self-Cleaning Film System and Method of Forming Same," 31 pages.

Science Mission Directorate, "Visible Light," NASA Science 2010, National Aeronautics and Space Administration; <http://science.nasa.gov/ems/09_visiblelight>.

First Office Action for Chinese Patent Application No. 201810443424.3 dated Oct. 9, 2019 with English language machine translation, 11 pages.

First Office Action for Chinese Patent Application No. 201810440683.0 dated Oct. 18, 2019 with English language machine translation, 14 pages.

\* cited by examiner

SELF-CLEANING FILM SYSTEM AND METHOD OF FORMING SAME

CROSS-REFERENCE TO RELATED APPLICATIONS

This application is a divisional of U.S. patent application Ser. No. 15/945,259 filed on Apr. 4, 2018, which is a continuation of U.S. patent application Ser. No. 15/598,845 filed on May 18, 2017. The entire disclosures of each of the above applications are incorporated herein by reference.

INTRODUCTION

The disclosure relates to a self-cleaning film system and to a method of forming the self-cleaning film system.

Devices, such as display systems, are often designed to be touched by an operator. For example, a vehicle may include a display system that presents information to an operator via a touchscreen. Similarly, an automated teller machine or kiosk may include a display system that is activated by touch.

Other devices, such as cameras and eyeglasses, generally include a lens surface which may be inadvertently touched by an operator during use. Further, other devices such as vehicles, windows, mirrors, appliances, cabinetry, furniture, cellular telephones, fingerprint scanners, sensors, copiers, medical instruments, and countertops may also include one or more surfaces which may be touched by an operator. Therefore, during use, an operator may deposit fingerprints and/or oils onto such devices and surfaces.

SUMMARY

A method of forming a film system includes depositing a monolayer formed from a fluorocarbon onto a substrate. After depositing, the method includes ablating the monolayer to define a plurality of cavities therein. Each of the plurality of cavities is spaced apart from an adjacent one of the plurality of cavities along the monolayer. After ablating, the method includes embedding a photocatalytic material into each of the plurality of cavities to form a film on the substrate and thereby form the film system. The film includes a plurality of regions including the photocatalytic material. The plurality of regions are disposed within the monolayer such that each of the first plurality of regions abuts and is surrounded by the fluorocarbon.

The method may further include irradiating the plurality of regions with electromagnetic radiation having a wavelength of from 400 nm to 100 nm. In another aspect, the method may include irradiating the plurality of regions with electromagnetic radiation having a wavelength of from 740 nm to 380 nm.

In one aspect, the method may further include contacting the film and squalene. The method may also include diffusing the squalene along the film from the monolayer to at least one of the plurality of regions. The method may further include heating the film. In addition, the method may also include oxidizing the squalene. The method may further include vaporizing the squalene. Further, the method may include photocatalyzing the squalene.

Depositing may include physically bonding the monolayer to the substrate. In another aspect, depositing may include chemically bonding the monolayer to the substrate.

In a further aspect, the film may have a first surface that is substantially free from squalene and a second surface spaced opposite the first surface and abutting the substrate. The substrate may have a proximal surface abutting the second surface and a distal surface spaced opposite the proximal surface. Ablating may include removing a plurality of molecules of the monolayer along the proximal surface to define the plurality of cavities such that each of the plurality of cavities extends from the first surface to the second surface.

In yet another aspect, embedding may include implanting the photocatalytic material into the monolayer such that the photocatalytic material forms pillars within the plurality of regions. Embedding may include covering portions of the monolayer with a mask such that the photocatalytic material is solely embedded into the plurality of cavities and is not deposited on top of the monolayer.

In another embodiment, the method of forming a film system includes concurrently chemisorbing a fluorocarbon and a functionalized photocatalytic material onto a substrate to form a film chemically bonded to the substrate and thereby form the film system. The film includes a monolayer formed from the fluorocarbon and a plurality of regions each formed from the functionalized photocatalytic material and each disposed within the monolayer such that each of the plurality of regions abuts and is surrounded by the fluorocarbon.

In one aspect, concurrently chemisorbing may include simultaneously depositing the fluorocarbon and the functionalized photocatalytic material onto the substrate. In another aspect, concurrently chemisorbing may include simultaneously chemically bonding the fluorocarbon and the functionalized photocatalytic material to the substrate.

The film may have a first surface that is substantially free from squalene and a second surface spaced opposite the first surface and abutting the substrate. The substrate has a proximal surface abutting the second surface and a distal surface spaced opposite the proximal surface. Concurrently chemisorbing may include chemically reacting the proximal surface with the fluorocarbon and the functionalized photocatalytic material to form the film.

In a further aspect, the method may further include contacting the film and squalene, diffusing the squalene along the film, and heating the film.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
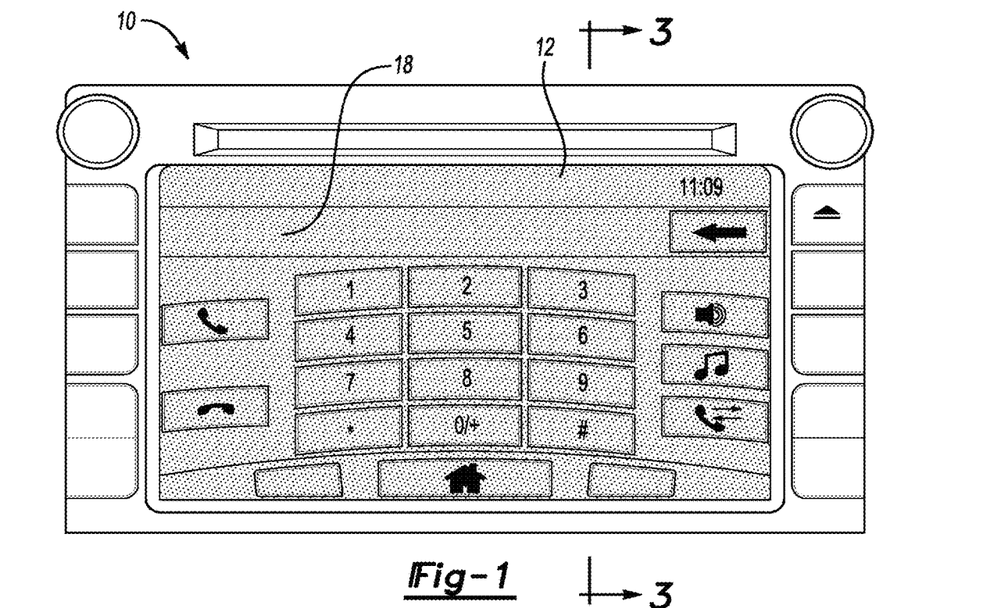
FIG. 1 is a schematic illustration of a front view of a self-cleaning film system.

Referring to the Figures, wherein like reference numerals refer to like elements, a self-cleaning film system 10 is shown generally in FIG. 1. The self-cleaning film system 10 may be suitable for applications in which an operator may touch and deposit fingerprints, oils, and/or other organic or carbon-based contaminants or pathogens onto a screen, lens, or surface. More specifically, the self-cleaning film system 10 may be useful for applications requiring a clean, substantially fingerprint-free screen, lens, or surface. That is, the self-cleaning film system 10 may be useful for removing fingerprints and other organic contaminants from such screens, lenses, or surfaces.

For example, the self-cleaning film system 10 may be useful for automotive applications such as in-dash navigation systems which include a touchscreen, or vehicle cameras which include a lens. Alternatively, the self-cleaning film system 10 may be useful for non-automotive applications such as, but not limited to, consumer electronics, cellular telephones, eyewear, personal protective equipment, appliances, furniture, kiosks, fingerprint scanners, medical devices, sensors, aircraft, and industrial vehicles.

Figure 2A:
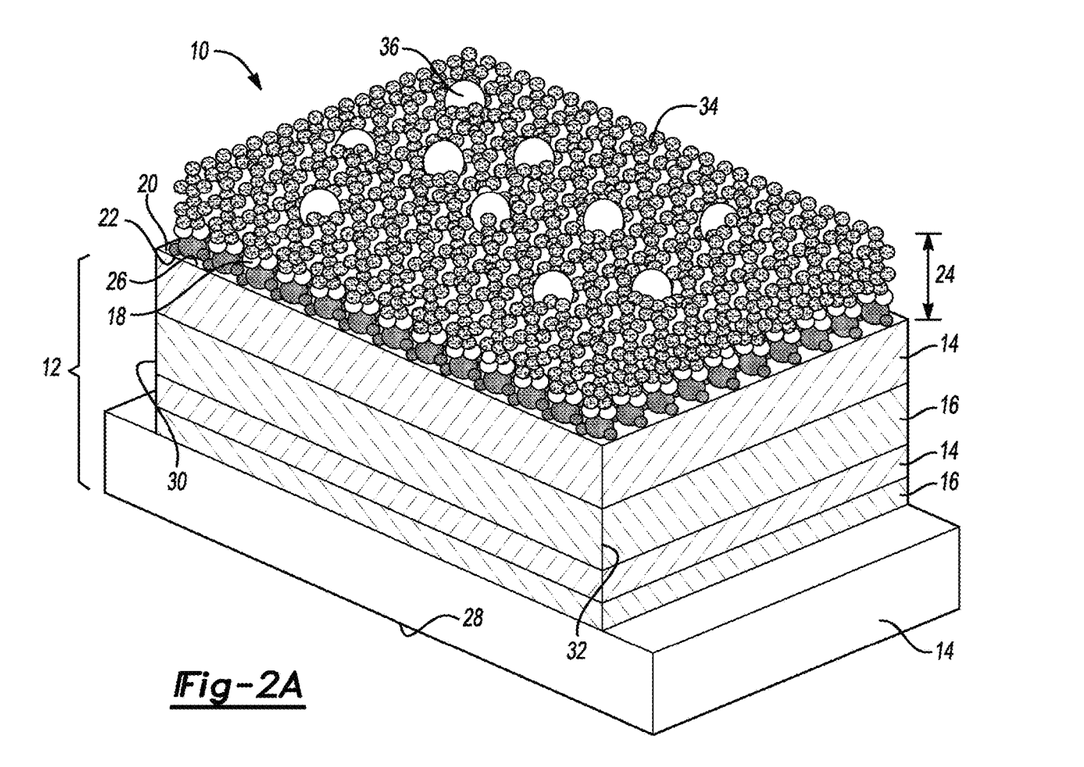
FIG. 2A is a schematic illustration of a magnified, perspective view of a portion of the self-cleaning film system of FIG. 1.
Figure 3:
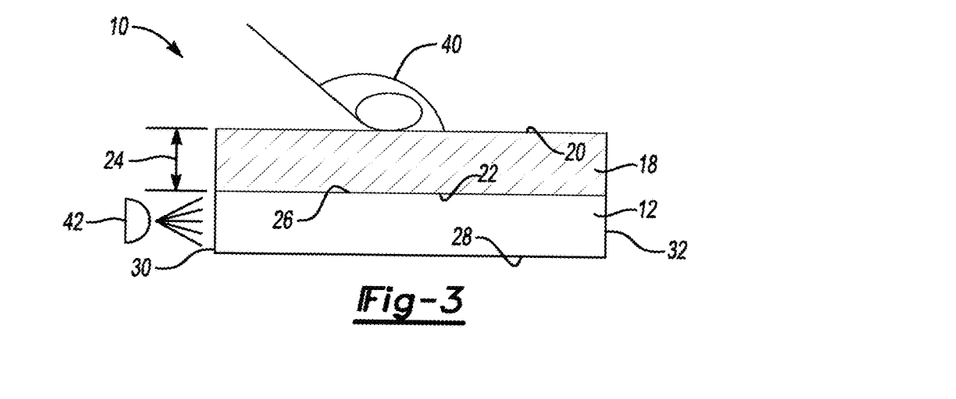
FIG. 3 is a schematic illustration of a cross-sectional view of the self-cleaning film system of FIG. 1 taken along section line 3-3.

Referring now to FIG. 3, the self-cleaning film system 10 may be applied to a substrate 12. The substrate 12 may be formed from a vitreous, transparent material suitable for refracting visible light. For example, in one embodiment, the substrate 12 may be formed from silicon dioxide. In another example, the substrate 12 may be formed from a polycarbonate or other plastic. Alternatively, as best shown in FIG. 2A, the substrate 12 may be formed from an anti-reflective coating comprising alternating layers 14, 16 of silicon dioxide and titanium dioxide. That is, the substrate 12 may be an anti-reflective film or coating. In general, the substrate 12 may be configured as, by way of non-limiting examples, a screen of a display system, a lens of eyeglasses or goggles, a visor of a helmet, a surface of a refrigerator, a face of a cabinet, a door panel of a vehicle, a touchscreen of a kiosk, or as another surface or device that may be touched by an operator.

The self-cleaning film system 10 also includes a film 18 disposed on the substrate 12, e.g., chemically bonded to the substrate 12 as set forth in more detail below. The film 18 may be configured to cover and protect the substrate 12 from fingerprints, oils, and organic contaminants. That is, the film 18 may be configured to cause fingerprints, oils, and organic contaminants deposited on the film 18 to vanish, disappear, or vaporize so as to maintain a clean substrate 12 that is capable of displaying crisp images or reflections.

More specifically, as described with reference to FIG. 3, the film 18 may have a first surface 20 and a second surface 22 spaced opposite the first surface 20. The second surface 22 may abut the substrate 12, and the first surface 20 may be substantially free from squalene, organic material, and/or other oils of fatty acids. As used herein, the terminology squalene refers to an organic compound having 30 carbon atoms and represented by the International Union of Pure and Applied Chemistry name (6E,10E,14E,18E)-2,6,10,15,19,23-hexamethyltetracosa-2,6,10,14,18,22-hexaene. In general, the film 18 may be characterized as a thin film and may have a thickness 24 of, for example, from 10 μm to 150 μm.

The substrate 12 also has a proximal surface 26 abutting the second surface 22 and a distal surface 28 spaced opposite the proximal surface 26. Therefore, the substrate 12 and the film 18 are configured to transmit visible light through the proximal surface 26, the distal surface 28, the first surface 20, and the second surface 22. The substrate 12 also has a first edge 30 connecting the proximal surface 26 and the distal surface 28, and a second edge 32 spaced opposite the first edge 30.

Figure 2B:
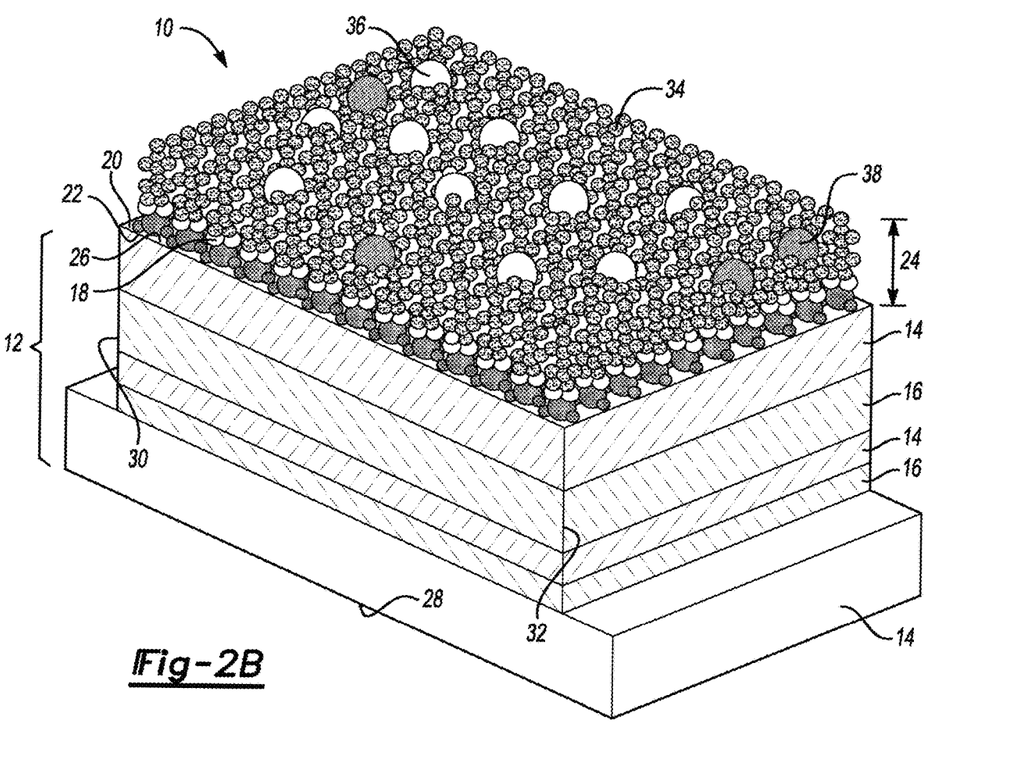
FIG. 2B is a schematic illustration of a magnified, perspective view of a portion of another embodiment of the self-cleaning film system of FIG. 1.

Referring now to FIGS. 2A and 2B, the film 18 includes a monolayer 34 formed from a fluorinated material selected from the group consisting of fluorinated organic compounds, fluorinated inorganic compounds, and combinations thereof. The monolayer 34 may form a majority of the film 18 and may be characterized as a monolayer field. As used herein, the terminology monolayer refers to a layer having a thickness 24 (FIG. 2A) of one molecule. That is, the monolayer 34 is one molecule thick and may be characterized as a thin layer. In one embodiment, the fluorinated material may be fluorinated diamond-like carbon. In another embodiment, the fluorinated material may be fluorinated tin (IV) oxide. The fluorinated material, i.e., fluorinated organic compounds, fluorinated inorganic compounds, and combinations thereof, provides the film 18 with superhydrophobicity, anti-microbial properties, anti-soiling properties, and scratch-resistance. The film 18 may also contribute to a clean air quality of an ambient environment in which the film 18 is used.

As shown in FIGS. 2A and 2B, the film 18 also includes a first plurality of regions 36 disposed within the monolayer 34 and spaced apart from one another such that each of the first plurality of regions 36 abuts, is surrounded by, and is not covered by the fluorinated material. That is, the first plurality of regions 36 are situated within and along the monolayer 34. In one embodiment, the first plurality of regions 36 may be equally spaced apart from each other along the first surface 20. In other embodiments, the first plurality of regions 36 may be randomly spaced throughout the monolayer 34 along the first surface 20. In still other embodiments, the first plurality of regions 36 may be arranged in a pattern within the monolayer 34. The first plurality of regions 36 may be present in the film 18 in an amount of from about 10 parts by volume to about 85 parts by volume based on 100 parts by volume of the film 18, e.g., about 50 parts by volume based on 100 parts by volume of the film 18.

Each of the first plurality of regions 36 includes a photocatalytic material, such as titanium dioxide. The photocatalytic material may provide the film 18 with self-cleaning capability. That is, the photocatalytic material may oxidize and/or vaporize organic material, e.g., squalene, present on the first surface 20 of the film 18, as set forth in more detail below. In particular, the photocatalytic material may be a light-activated photocatalyst upon exposure to, for example, visible or ultraviolet light.

Suitable photocatalytic materials may include, but are not limited to, photo-oxidative semiconductors, semiconducting oxides, doped metal oxides, heterojunction materials, and combinations thereof.

In one embodiment, the photocatalytic material may be titanium dioxide and may be present in the first plurality of regions 36 in a rutile form. Alternatively, the photocatalytic material may be titanium dioxide and may be present in the first plurality of regions 36 in an anatase form, which may exhibit a comparatively higher photocatalytic activity than the rutile form. In other embodiments, the photocatalytic material may be titanium dioxide and may be present in the first plurality of regions 36 as a combination of the rutile form and the anatase form. Further, the photocatalytic material may be doped to form a functionalized photocatalytic material, e.g., functionalized titanium dioxide. For example, the functionalized photocatalytic material may be doped with a metal such as, but not limited to, chromium, cobalt, tungsten, copper, vanadium, iron, silver, platinum, molybdenum, lanthanum, niobium, and combinations thereof. Alternatively, the functionalized photocatalytic material may be doped with a non-metal such as, but not limited to, nitrogen, sulfur, carbon, boron, potassium, iodine, fluorine, and combinations thereof. In one example, the photocatalytic material may be doped with silver. Doping the photocatalytic material may increase a solar response of the photocatalytic material, may provide a comparatively higher photon abundance, and may increase a photo-activity of the photocatalytic material.

The photocatalytic material may be characterized as a nanoparticle and may have an average diameter measurable on a nanometer scale. Alternatively, the photocatalytic material may be characterized as a particle and may have an average diameter measurable on a micrometer scale. The photocatalytic material may have a thickness of from 1 µm to 10 µm. Generally, the photocatalytic material may be present in the film 18 in an amount of from about 2 parts by volume to about 35 parts by volume based on 100 parts by volume of the film 18.

In other non-limiting embodiments, the first plurality of regions 36 may include a semiconducting oxide such as, but not limited to, zinc oxide, bismuth, tin oxide, and combinations thereof. The semiconducting oxide may be selected to have a band gap separation suitable for a photocatalytic reaction, as set forth in more detail below.

In another embodiment described with reference to FIG. 2B, the film 18 may include a second plurality of regions 38 disposed within the monolayer 34 such that each of the second plurality of regions 38 abuts and is surrounded by the fluorinated material, wherein each of the second plurality of regions 38 includes silver. The second plurality of regions 38 may not be covered by the fluorinated material.

That is, the second plurality of regions 38 may also be situated within and along the monolayer 34. In one embodiment, the second plurality of regions 38 may be equally spaced apart from each other along the first surface 20. In other embodiments, the second plurality of regions 38 may be randomly spaced throughout the monolayer 34 along the first surface 20. In still other embodiments, the second plurality of regions 38 may be arranged in a pattern within the monolayer 34. The second plurality of regions 38 may be present in the film 18 in an amount of from about 10 parts by volume to about 85 parts by volume based on 100 parts by volume of the film 18, e.g., about 25 parts by volume based on 100 parts by volume of the film 18.

The silver may be characterized as a nanoparticle and may have an average diameter measurable on a nanometer scale. Alternatively, the silver may be characterized as a particle and may have an average diameter measurable on a micrometer scale. Generally, the silver may be present in the film 18 in an amount of from about 2 parts by volume to about 35 parts by volume based on 100 parts by volume of the film 18. The silver may provide the film 18 with soil-resistance, anti-microbial, and air-purifying properties. For example, the silver may disrupt microbe cellular function. In particular, the silver may contribute to phospholipid decomposition such that a microbe cell well cannot undergo respiration.

Referring again to FIG. 3, the film 18 defines a contact angle 40 with water of greater than 140°. For example, the film 18 may define a contact angle 40 with water of greater than or equal to 150°. As such, water, oils, and contaminants may effectively bead on and translate across the first surface 20. Stated differently, water, oils, and contaminants may be mobile and effectively translate along the first surface 20.

The self-cleaning film system 10 may further include a light source 42 disposed adjacent the first edge 30 and configured for emitting electromagnetic radiation. For example, the light source 42 may be an ultraviolet light-emitting diode and the electromagnetic radiation may have a wavelength of from 400 nm to 100 nm. Alternatively, the light source 42 may be an incandescent bulb or a visible light-emitting diode and the electromagnetic radiation may have a wavelength of from 740 nm to 380 nm.

Figure 4:
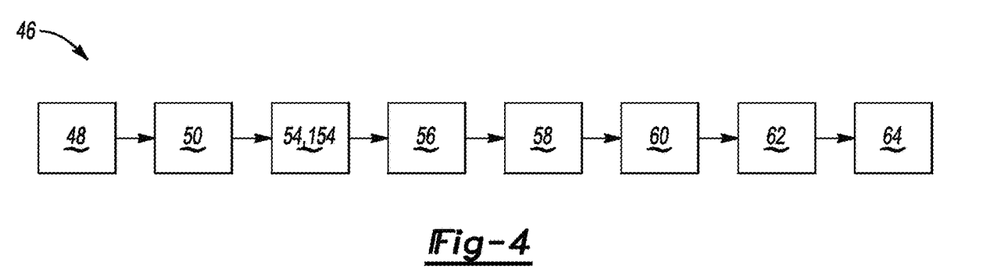
FIG. 4 is a flowchart of one embodiment of a method of forming the self-cleaning film system of FIGS. 1-3.
Figure 5:
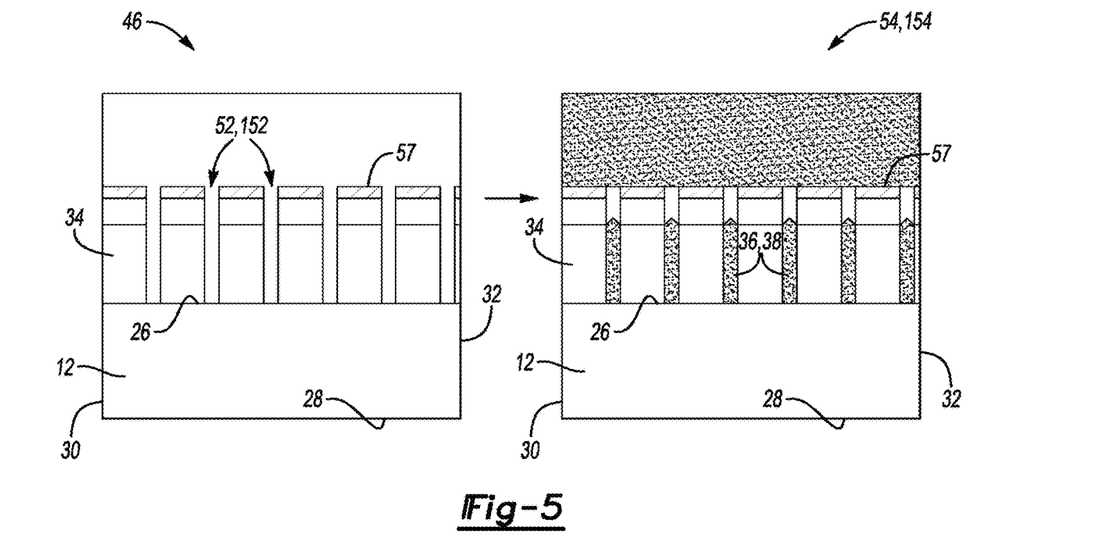
FIG. 5 is a schematic illustration of portions of the method of FIG. 4.

Referring now to FIGS. 4 and 5, a method 46 of forming the self-cleaning film system 10 is illustrated generally. The method 46 includes depositing 48 the monolayer 34 formed from a fluorinated material selected from the group consisting of fluorinated organic compounds, fluorinated inorganic compounds, and combinations thereof onto the substrate 12. In one embodiment, the method 46 may further include depositing 48 the monolayer 34 formed from silver onto the substrate 12. By way of non-limiting examples, depositing 48 may include chemical vapor depositing (CVD), physical vapor deposition (PVD), atomic layer deposition (ALD), dipping, wiping, spraying, meniscus coating, wet coating, combinations thereof, and the like. Depositing 48 may include forming a self-aligned monolayer 34 that is physically adsorbed, i.e., physisorbed, and cross-linked with neighboring molecules. In one example, depositing 48 may include magnetron sputter depositing a graphite target and a polytetrafluoroethylene target, i.e., co-sputtering. In another example, depositing 48 may include reactive magnetron sputter depositing graphite and polytetrafluoroethylene in a fluorine-containing gas, such as, but not limited to, difluoroacetylene gas, octafluorocyclobutane gas, tetrafluoromethane gas, and hexafluoropropylene oxide gas, which may contribute to a superhydrophobicity of the film 18.

That is, the monolayer 34 may be deposited in a suitable manner onto the substrate 12 such that the monolayer 34 chemically or physically bonds to the substrate 12. For example, for embodiments in which the substrate 12 is formed from silicon dioxide, each molecule of fluorinated material may be crosslinked to adjacent molecules of fluorinated material and new chemical bonds may be generated at the proximal surface 26 (FIG. 3) as the monolayer 34 is deposited onto the substrate 12.

After depositing 48, the method 46 may include ablating 50 the monolayer 34 to define a first plurality of cavities 52 (FIG. 5), wherein each of the first plurality of cavities 52 is spaced apart from an adjacent one of the first plurality of cavities 52 along the monolayer 34. In another embodiment, ablating 50 the monolayer 34 may also define a second plurality of cavities 152, wherein each of the second plurality of cavities 152 is spaced apart from an adjacent one of the second plurality of cavities 152 along the monolayer 34. As non-limiting examples, ablating 50 may include laser ablating, plasma ablating, ultraviolet ablating, and the like. Ablating 50 may remove several molecules of the fluorinated material monolayer 34 along the proximal surface 26 to define the first plurality of cavities 52. Similarly, ablating 50 may remove several molecules of the fluorinated material monolayer 34 along the proximal surface 26 to define the second plurality of cavities 152. Generally, the first plurality of cavities 52 may extend from the first surface 20 (FIG. 2A) of the film 18 to the second surface 22 (FIG. 2A) of the film 18. Similarly, the second plurality of cavities 152 may extend from the first surface 20 of the film 18 to the second surface 22 of the film 18.

After ablating 50, the method 46 may include embedding 54 the photocatalytic material into each of the first plurality of cavities 52 to form the film 18 on the substrate 12 and thereby form the self-cleaning film system 10. Therefore, the film 18 includes the first plurality of regions 36 (FIG. 2A) including the photocatalytic material. The first plurality of regions 36 are disposed within the monolayer 34 and spaced apart from one another such that each of the first plurality of regions 36 abuts, is surrounded by, and is not covered by the fluorinated material. Similarly, the method 46 may include embedding 54 silver into each of the second plurality of cavities 152 to form the film 18 on the substrate 12. Therefore, the film 18 may include the second plurality of regions 38 (FIG. 2B) including silver and disposed within the monolayer 34 such that each of the second plurality of regions 38 abuts and is surrounded by the silver. The second plurality of regions 38 may also not be covered by the fluorinated material.

Embedding 54 may include implanting or arranging the photocatalytic material into the monolayer 34 such that the photocatalytic material forms pillars within the first plurality of regions 36. For example, embedding 54 may include covering portions of the monolayer 34 with a mask 57 (FIG. 5) such that photocatalytic material is solely embedded into the first plurality of cavities 52 and is not deposited on top of the monolayer 34. Suitable processes for embedding 54 the photocatalytic material into the first plurality of cavities 52 to form the first plurality of regions 36 surrounded by the monolayer 34 include, but are not limited to, ion beam deposition, atomic layer deposition, chemical vapor deposition, physical vapor deposition, chemical precipitation, electrophoresis deposition, sputtering, co-sputtering, ion implantation, evaporation, co-evaporation, and pulsed laser deposition.

Embedding 154 may also include implanting or arranging silver into the monolayer 34 such that the silver forms pillars within the second plurality of regions 38. For example, embedding 154 may include covering portions of the monolayer 34 with the mask 57 (FIG. 5) such that silver is solely embedded into the second plurality of cavities 152 and is not deposited on top of the monolayer 34. Suitable processes for embedding 54 silver into the first plurality of cavities 52 to form the second plurality of regions 38 surrounded by the monolayer 34 include, but are not limited to, ion beam deposition, atomic layer deposition, chemical vapor deposition, physical vapor deposition, chemical precipitation, electrophoresis deposition, sputtering, co-sputtering, ion implantation, evaporation, co-evaporation, and pulsed laser deposition.

In another embodiment, although not shown, the method 46 includes concurrently chemisorbing the fluorinated material and the functionalized photocatalytic material onto the substrate 12 to form the film 18 chemically bonded to the substrate 12 and thereby form the self-cleaning film system 10. The film 18 thus includes the monolayer 34 formed from the fluorinated material, and the first plurality of regions 36 each formed from the functionalized photocatalytic material and each disposed within the monolayer 34 and spaced apart from one another such that each of the first plurality of regions 36 abuts, is surrounded by, and is not covered by the fluorinated material. That is, the fluorinated material and the functionalized photocatalytic material may be deposited onto the substrate 12, simultaneously adsorbed onto the substrate 12, and chemically bonded to the substrate 12. The proximal surface 26 of the substrate 12 may concurrently chemically react with the fluorinated material and the functionalized photocatalytic material to form the film 18.

After embedding 54 or concurrently chemisorbing, the film 18 includes the first plurality of regions 36 formed from the photocatalytic material and spaced apart from one another along the first surface 20 (FIG. 3). Such regions 36 may be useful for removing fingerprints from the film 18 so that the film 18 exhibits self-cleaning capability. In another embodiment, the film 18 may include the second plurality of regions 38 (FIG. 2B) formed from silver and spaced apart from one another along the first surface 20. Such second regions 38 may be useful for increasing the anti-fouling and anti-microbial properties of the film 18 and may assist with odor removal from an ambient environment.

More specifically, referring again to FIGS. 4 and 5, the method 46 may further include irradiating 56 the first plurality of regions 36 with electromagnetic radiation having a wavelength of from 400 nm to 100 nm, i.e., irradiating 56 the first plurality of regions 36 with ultraviolet light. Alternatively, the method 46 may include irradiating 56 the first plurality of regions 36 with electromagnetic radiation having a wavelength of from 740 nm to 380 nm, i.e., irradiating 56 the first plurality of regions 36 with visible light. That is, the light source 42 (FIG. 3) may be selected to emit electromagnetic radiation having a wavelength tuned to a bandgap of the photocatalytic material to initiate photocatalysis of the squalene deposited as a fingerprint, as set forth in more detail below. As used herein, the terminology bandgap refers to a difference in energy between the highest permitted energy level for an electron in a valence band of the photocatalytic material and the lowest permitted energy level in a conduction band of the photocatalytic material. In other words, the bandgap refers to the minimum amount of light required to make the photocatalytic material electrically conductive.

The method 46 may further include contacting 58 the film 18 and squalene. That is, contacting 58 may include touching the film 18 such that an operator deposits fingerprints, squalene, organic matter, and/or oils onto the first surface 20 (FIG. 3). Oils may include oils of fatty acids and may be synthesized naturally and applied to the film 18 as the operator touches the film 18, or may be applied to the film 18 artificially such as by spraying or coating. Contact between the squalene and the photocatalytic material which is exposed to electromagnetic radiation emitted by the light source 42 may initiate a photocatalytic reaction. More specifically, the photocatalytic material may be a photocatalyst such as titanium dioxide or titanium dioxide doped with silver. The photocatalytic reaction may create a strong oxidation agent and breakdown the organic matter, e.g., squalene, to carbon dioxide and water in the presence of the photocatalyst, i.e., the photocatalytic material; electromagnetic radiation, e.g., ultraviolet light; and water, e.g., humidity from ambient conditions. As such, the photocatalytic material not be consumed by the catalytic reaction, but may instead solely accelerate the photocatalytic reaction as a non-reactant.

In greater detail, when electromagnetic radiation having a desired wavelength illuminates the photocatalytic material, e.g., titanium dioxide, titanium dioxide doped with silver, or a mixture of titanium dioxide nanoparticles and silver nanoparticles, an electron from the valence band of the photocatalytic material may promote to the conduction band of the photocatalytic material, which in turn may create a hole in the valence band and an excess of negative charge or electron in the conduction band. The hole may assist oxidation and the electron may assist reduction. Generally, the hole may combine with water to produce a hydroxyl radical (.OH). The hole may also react directly with squalene or other organic material to increase an overall self-cleaning efficiency of the film 18. Similarly, oxygen in the ambient environment surrounding the photocatalytic material may be reduced by the electron to form a superoxide ion ($.O_2-$), which in turn may oxidize the organic material present on the film 18. Therefore, the method 46 may include oxidizing 60 the squalene. For embodiments including silver, the hydroxyl radical may also decompose a phospholipid portion of a microbe cellular wall and cytoplasm wall such that the microbe dies from lack of respiration, which may decompose organic matter present on the film 18 and contribute to anti-fouling and anti-staining properties of the film 18.

In addition, the hole may become trapped before recombination with the electron. For such situations, the photocatalytic material may be functionalized. For example, the method may include doping titanium dioxide with, for example, palladium or ruthenium. The palladium or ruthenium may act as an electrocatalyst and may increase a transfer of electrons to oxygen molecules, which may in turn lower the occurrence of the recombination of electrons and holes.

Further, organic material that is present on the film 18 at the monolayer 34 rather than in direct contact with the first plurality of regions 36 may be in dynamic equilibrium with the first surface 20 (FIG. 3) and may diffuse toward a comparatively higher-energy location on the film 18, i.e., the first plurality of regions 36. Therefore, the method 46 may also include diffusing 62 the squalene along the film 18 from the monolayer 34 to at least one of the first plurality of regions 36. To improve such diffusion, the light source 42 may be tuned to emit electromagnetic radiation having a wavelength that is tuned to a vibration resonance of the squalene and the fluorinated material. Such tuning may enable the squalene or fingerprint to wiggle or translate along the monolayer 34 to the first plurality of regions 36 where the squalene may undergo the photocatalytic reaction described above. Alternatively or additionally, the film 18 may also be heated, for example by infrared radiation, to further improve diffusion across the monolayer 34 towards the first plurality of regions 36.

As such, the method 46 may further include vaporizing 64 the squalene. More specifically, once the squalene contacts the photocatalytic material at the first plurality of regions 36, the squalene may be photolyzed into comparatively low vapor pressure-sized pieces or parts, which may vaporize off the film 18 and thereby remove the fingerprint or squalene from the film 18. Therefore, the self-cleaning film system 10 may be characterized as self-cleaning. That is, the film 18 may protect the substrate 12 by removing, e.g., oxidizing 60 and vaporizing 64, the fingerprints, squalene, oils, and/or organic material deposited by the touch of an operator. Consequently, the self-cleaning film system 10 and method 46 may provide excellent aesthetics, cleanliness, and readability for display systems, lenses, sensors, and surfaces. In particular, the film 18 may be comparatively thin, super hydrophobic, transparent, scratch-resistant, durable, tough, and may be a hard coating, i.e., may have a hardness of greater than 17.5 GPa and an elastic modulus of greater than 150 GPa.

While the best modes for carrying out the disclosure have been described in detail, those familiar with the art to which this disclosure relates will recognize various alternative designs and embodiments for practicing the disclosure within the scope of the appended claims.

What is claimed is:

1. A method of forming a film system, the method comprising:
   concurrently chemisorbing a fluorocarbon and a functionalized photocatalytic material onto a substrate to form a film chemically bonded to the substrate and thereby form the film system, wherein the film includes:
   a monolayer formed from the fluorocarbon; and
   a plurality of regions each formed from the functionalized photocatalytic material and each disposed within the monolayer such that each of the plurality of regions abuts and is surrounded by the fluorocarbon.

2. The method of claim 1, wherein concurrently chemisorbing includes simultaneously depositing the fluorocarbon and the functionalized photocatalytic material onto the substrate.

3. The method of claim 2, wherein concurrently chemisorbing includes simultaneously adsorbing the fluorocarbon and the functionalized photocatalytic material onto the substrate.

4. The method of claim 3, wherein concurrently chemisorbing includes simultaneously chemically bonding the fluorocarbon and the functionalized photocatalytic material to the substrate.

5. The method of claim 1, wherein the film has a first surface that is substantially free from squalene and a second surface spaced opposite the first surface and abutting the substrate;
   wherein the substrate has a proximal surface abutting the second surface and a distal surface spaced opposite the proximal surface; and
   wherein concurrently chemisorbing includes chemically reacting the proximal surface with the fluorocarbon and the functionalized photocatalytic material to form the film.

6. The method of claim 1, further including:
   contacting the film and squalene;
   diffusing the squalene along the film; and
   heating the film.

7. The method of claim 1, wherein the substrate comprises alternating layers of silicon dioxide and titanium dioxide.

8. The method of claim 1, wherein the functionalized photocatalytic material comprises one or more of photo-oxidative semiconductors, semiconducting oxides, doped metal oxides, and heterojunction materials.

9. The method of claim 1, wherein the functionalized photocatalytic material comprises rutile form titanium dioxide.

10. The method of claim 1, wherein the functionalized photocatalytic material includes one or more metal dopants selected from the group consisting of: chromium, cobalt, tungsten, copper, vanadium, iron, silver, platinum, molybdenum, lanthanum, niobium, and combinations thereof.

11. The method of claim 1, wherein the functionalized photocatalytic material includes one or more non-metal dopants selected from the group consisting of: nitrogen, sulfur, carbon, boron, potassium, iodine, fluorine, and combinations thereof.

12. The method of claim 1, wherein the file comprises greater than or equal to about 2 parts by volume to about 35 parts by volume of the functionalized photocatalytic material based on 100 parts by volume of the film.

13. The method of claim 1, wherein the plurality of regions are present in the film in an amount greater than or equal to about 10 parts by volume to less than or equal to about 85 parts by volume based on 100 parts by volume of the film.

14. The method of claim 1, wherein the plurality of regions includes a first plurality of regions comprising titanium dioxide and a second plurality of regions comprising silver.

15. A method of forming a film system, the method comprising:

concurrently chemisorbing a fluorocarbon and a functionalized photocatalytic material comprising at least one dopant onto a substrate to form a film chemically bonded to the substrate and thereby form the film system, wherein the film includes:

a monolayer formed from the fluorocarbon; and a plurality of regions each formed from the functionalized photocatalytic material and each disposed within the monolayer such that each of the plurality of regions abuts and is surrounded by the fluorocarbon.

16. The method of claim 15, wherein the at least one dopant is selected from the group consisting of: chromium, cobalt, tungsten, copper, vanadium, iron, silver, platinum, molybdenum, lanthanum, niobium, nitrogen, sulfur, carbon, boron, potassium, iodine, fluorine, and combinations thereof.

17. A method of forming a film system, the method comprising:

concurrently chemisorbing a fluorocarbon and two or more functionalized photocatalytic materials onto a substrate to form a film chemically bonded to the substrate and thereby form the film system, wherein the film includes:

a monolayer formed from the fluorocarbon;

a first plurality of regions comprising a first functionalized photocatalytic material of the two or more functionalized photocatalytic materials; and a second plurality of regions comprising a second functionalized photocatalytic material of the two or more functionalized photocatalytic materials, wherein the first and second functionalized photocatalytic materials are different and the first plurality of regions and the second plurality of regions are each disposed within the monolayer such that the first and second plurality of regions each abuts and is surrounded by the fluorocarbon.

18. The method of claim 17, wherein concurrently chemisorbing comprises depositing, adsorbing, or bonding the fluorocarbon and the two or more functionalized photocatalytic materials onto the substrate.

19. The method of claim 17, wherein at least one of the two or more functionalized photocatalytic material comprises one or more dopants selected from the group consisting of: chromium, cobalt, tungsten, copper, vanadium, iron, silver, platinum, molybdenum, lanthanum, niobium, nitrogen, sulfur, carbon, boron, potassium, iodine, fluorine, and combinations thereof.

20. The method of claim 17, further including:
contacting the film and squalene;
diffusing the squalene along the film; and
heating the film.

\* \* \* \* \*